May 10, 1949.   H. C. LORD   2,469,394
CUSHIONED TIRE

Filed Oct. 24, 1942   2 Sheets-Sheet 1

INVENTOR.
Hugh C. Lord

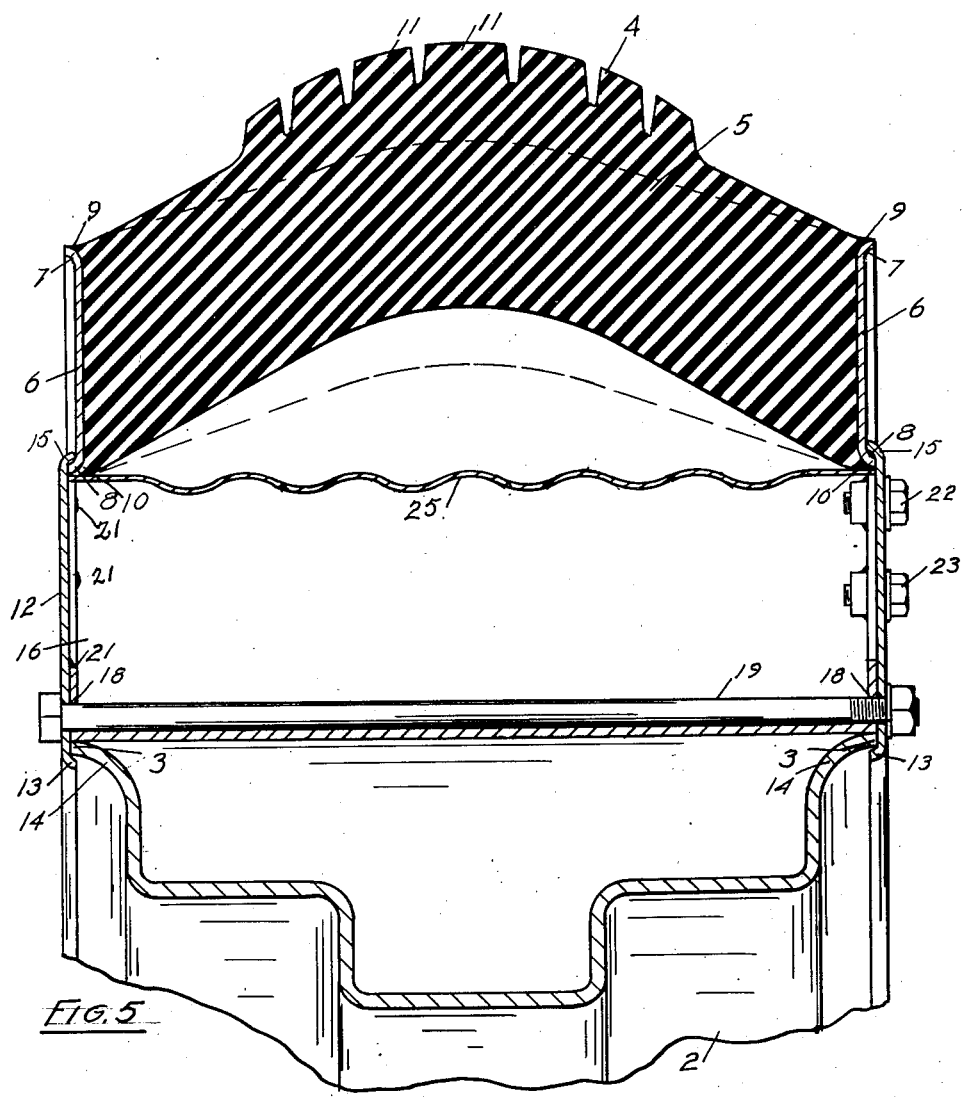
Fig. 5
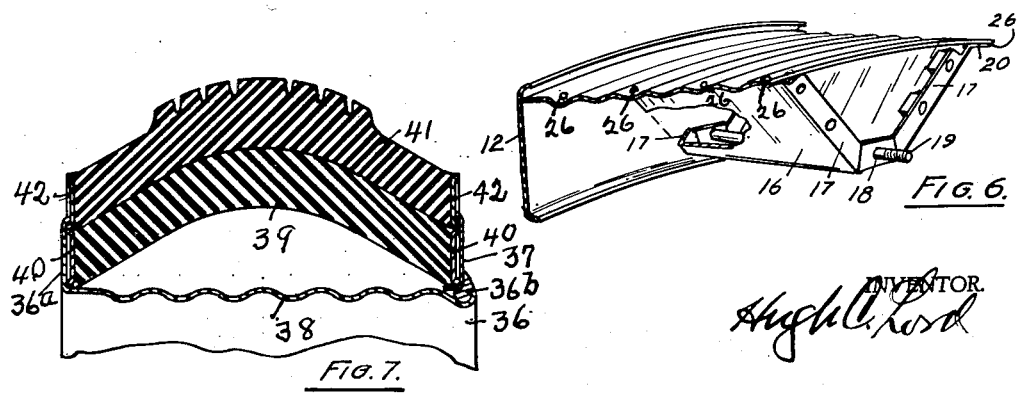
Fig. 6.
Fig. 7.
INVENTOR.
Hugh C. Lord

Patented May 10, 1949

2,469,394

UNITED STATES PATENT OFFICE 2,469,394

CUSHIONED TIRE

Hugh C. Lord, Erie, Pa.

Application October 24, 1942, Serial No. 463,207

9 Claims. (Cl. 152—327)

This invention relates to cushioned tires and is designed to utilize a load carrying span of rubber stressed in shear to effect the cushioning action.

Features and details of the invention will appear from the specification and claims.

Figure 1:
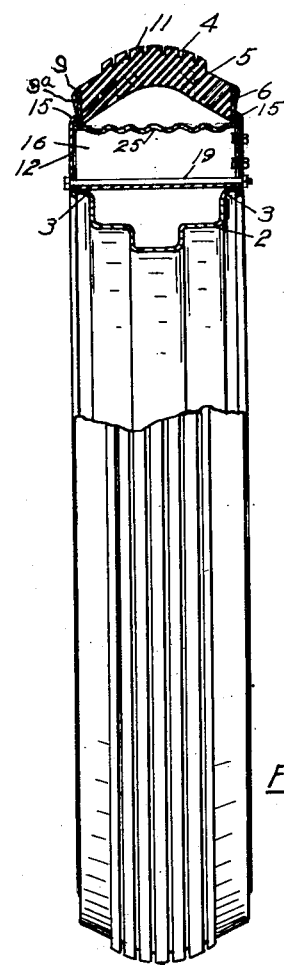
Figure 2:
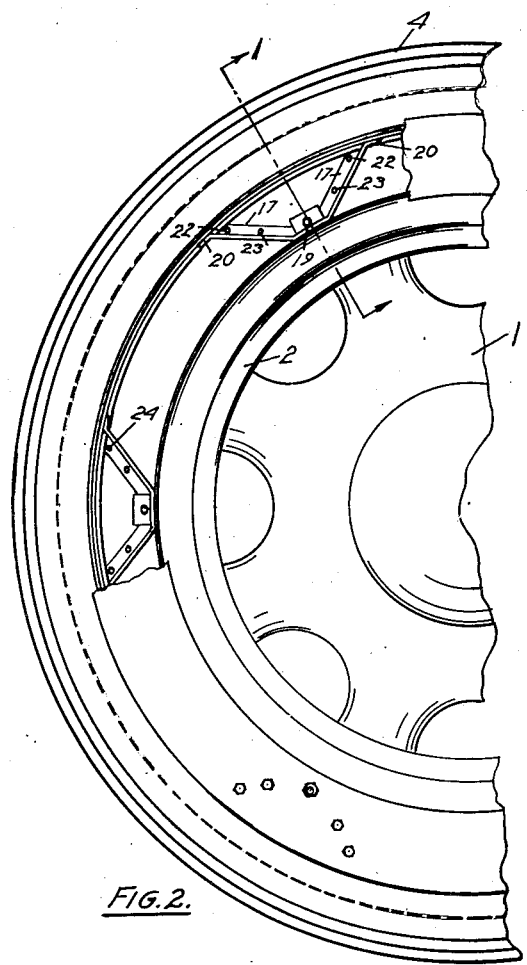

Preferred embodiments of the invention are illustrated in the accompanying drawings as follows:

Fig. 1 shows a front elevation of a wheel, partly in section, on the line 1—1 in Fig. 2.

Fig. 2 a side elevation of the wheel.

Figure 3:
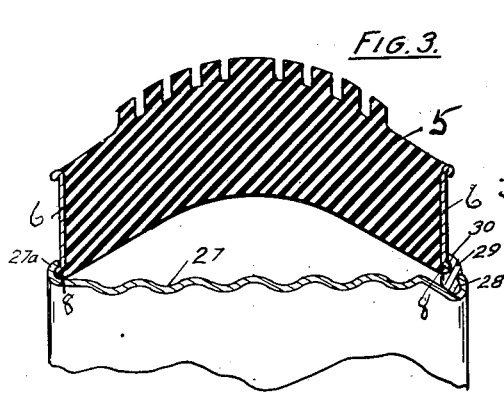

Fig. 3 an alternative structure in section providing a direct application of the tire to the rim and with one type of locking ring.

Figure 4:
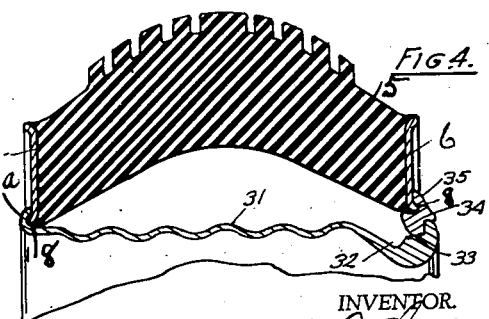

Fig. 4 a section similar to Fig. 3 with a different type of locking ring.

Fig. 5 an enlarged section with slight variation similar to that of Fig. 1.

Fig. 6 a perspective view of a detail of construction.

Fig. 7 a cross section showing an alternative structure with a laminated span.

In Figs. 1, 2, 5 and 6, 1 marks the wheel, 2 the wheel rim. As shown, this is a standard drop-center rim having the edges 3. 4 marks the tire as a whole. The tire has a circumferential cushion 5 of resilient material such as rubber. This cushion spans the space between rigid side walls 6 to which it is preferably secured by surface bonding during vulcanization. The side walls are ordinarily metal rings with out-turned flanges 7 (Fig. 5) at their outer peripheries and similar flanges 8 on their inner peripheries.

The span is preferably arched crosswise of the tire and as the center of the arch receives the load and is depressed, the flattening deflection is resisted through shear action of the rubber. The angle of shear movement may be made greater or less, depending on the quality of the rubber and the tread life of the tire.

The rubber forming the cushion preferably extends at 9 over the out-turned flange 7 providing a more secure bond. In Fig. 1 the rubber is extended at 9a along the outer face of the wall 6 providing some side cushion for the tire. Similarly the rubber at 10 extends under the flange 8. Here the rubber is made slightly thicker so that it not only makes a more secure bond but also provides a seat for the metal ring, if such a seat is desired.

Preferably the tread is provided with wearing ribs 11. These may be extended to a greater or less width of the cross surface of the load carrying span as desired, and may have any pattern desired, but preferably are in the form of ribs providing intervening grooves so as not to materially interfere with the flexing of the span in a cross direction.

In order that the cushion may be mounted on a standard wheel, it is necessary to carry the cushioned portion of the tire outwardly so as to give substantially the same tread diameter as in the pneumatic tire for which the wheel is designed. This is accomplished in the embodiment of Figs. 1, 2, 5 and 6 by spacer rings 12. As shown, the inner periphery of the spacer ring 12 has an inturned flange 13 which engages the edge 3 of the out-turned flange 14 found on the standard drop-center rim. The outer periphery of the rings 12 have inturned flanges 15 which extend over flanges 8 on the side walls.

Braces 16 extend axially across the space between the spacer rings 12. These are V-shaped, the converging end next to the hub extending slightly circumferentially and curved to fit the outer face of the flange 14. The cross-braces have flanges 17 which are adapted to face and engage the spacer rings 12. The flanges 17 have openings 18 near the hub and bolts 19 extend through these openings and are adapted to clamp the plates against the edges of the flanges 14. The upper edges of the cross members have flanges 20.

One of the plates 12 is permanently secured to the cross members by spot welds 21 which connect the flanges 17 with the spacer ring. At the opposite side studs 22 and 23 extend from perforations 24 in the flanges 17. As the studs 22 and 23 are set up, the plates 12 are drawn toward each other. The span of the tire is so dimensioned in width that it is compressed as the plates are drawn together, thus effecting a pressure engagement of the hooked edges 15 with the sides 16, locking the sides by reason of the flanges 8 in position.

A stop band 25 extends circumferentially around the wheel and crosswise between the rings 12 and is secured to the cross braces 16 by spot welds 26 securing the stop band to the flanges 20. The stop band limits the inward clamping movement of the rings 12 so as to give the desired compression to the tire span. The distance between the stop band 25 and the under surface of the span determines the ultimate clearance or cushioning movement through which the shear action of the rubber may be effective, the major portion of the ultimate load, however, being sustained by compression stress of the rubber on the stop band and outer edges of the side walls.

In the structure as shown where the span is arched and the under surface of the tire is similarly arched, the stop band will extend substantially straight across the wheel but the shape of the tire may be such as to require the arching or depression of the stop band to provide the desired clearance and the desired limiting of the final position under maximum load of the tread.

Preferably the stop band is circumferentially corrugated forming slight depressions into which the rubber is forced under severe shock. Thus the final arrest of movement is progressive, preventing, in effect, a hammer blow at this extreme deflection. The yielding of the side walls 6 under extreme compression of the rubber also permits a slight outward expansion and consequent cushioning at this final stop.

With this structure it will be noted that the deflection rate may be made practically anything desired. The capacity can also be extended as desired. As the width of the span is increased, the shear angle for a given yielding of the tire is decreased and to that extent the tire is softened. The capacity with any width may be increased by increasing the thickness of the span. Thus practically any capacity may be achieved with any desired degree of softness with any desired clearance by changing the span and the thickness.

Rubber in shear has very desirable cushioning characteristics, making it possible to approximate, and in some respects improve, the functioning of a pneumatic tire. The wide base of the span and angle of the walls gives greater stability against side movement than is accomplished with pneumatic tires. Greater clearance is afforded with relation to the brakes, thus permitting of larger brake bands and less communication of heat to the tire. The tire can be easily and cheaply fabricated, readily applied, and is not subject to the hazard encountered in pneumatic tires, thus eliminating the necessity for spares.

In the alternative construction, Fig. 3, the tire is mounted on a wheel initially formed to receive it. A stop band 27 forms the rim of the wheel. It is provided with a hooked edge 27a at one side adapted to engage the flange 8. At the opposite side as shown there is a lock groove 28 adapted to receive a split lock ring 29 which has a hooked edge 30 adapted to engage the edge 8 of the side plate 6.

In applying the wheel, the rubber is compressed axially sufficiently to permit the insertion of the lock ring 29.

In Fig. 4 we have shown a structure which utilizes a continuous lock ring. In it a wheel rim 31 has a drop groove 32 and a ring shoulder 33. The lock ring 34 is continuous. It has a hook 35 engaging the flange 8. The rim 31 has a hooked edge 31a engaging the flange 8 on the tire.

In this structure, as in the other, the rubber structure is compressed laterally to give the clearance for the application of the ring. The ring is dropped into the drop groove 32 at one side. This permits the buttoning of the balance of the ring over the edge of the rim. The ring is finally seated on the shoulder 33. The pressure on the tire is released, and this locks the lock ring in position.

The construction and the functioning of the tire in these alternative constructions is the same as with the structure illustrated in Fig. 1.

In Fig. 7 we have shown a laminated tire. In this structure 36 marks the rim of the wheel. This has side flanges 36a of sufficient height to engage the lower flanges of the side plates of the outer lamination of the tire. A split ring 36b operates on the rim and locks a ring 37 which is high enough to engage the lower flange on the outer laminated tire. The wheel rim 36 has a stop plate 38 similar to stop plate 27 in Fig. 3 and tire laminations 39 and 41. The inner tire lamination 39 has rigid side plates 40 similar to side plates 6 and the outer lamination 41 has rigid side plates 42 similar to the plates 6.

The tire operates in general in the same manner as that shown in Fig. 1. The shear is effective in the lamination in much the same respect in the dual laminations as though the structure as a whole were solid.

It is sometimes difficult with certain qualities of rubber to vulcanize large masses of rubber uniformly and this is avoided largely by laminating the tire as a whole. It is also desirable in some structures to provide a different wheel surface than that providing some of the resilience for the cushion. Thus the outer lamination may be made of desirable wear stock and the inner lamination of a different or more resilient stock. Further, this structure simplifies to some extent the removal of the tread which may be accomplished by merely removing the outer lamination.

What I claim as new is:

1. A cushioned tire comprising rigid side walls, a span of resilient material such as rubber secured between the walls and free to flex inwardly through shear of the rubber relatively to the side walls under inward thrust, and a stop surface initially spaced from the inner surface of the span and limiting the inward movement of the span subjected to inward thrust, the stop member being corrugated providing for progressive engagement of the inner surface of the tire with the member.

2. A cushioned tire comprising rigid side walls, and a span of resilient material such as rubber between the walls, said rubber being secured to the walls by surface unions, and free to flex inwardly through shear of the rubber relatively to the side walls under inward thrust, the resilient material extending under the inner peripheries of the side walls forming seats for the side walls.

3. A cushioned tire comprising rigid side walls and a span of resilient material such as rubber of shear softness in a radial direction secured to the side walls by a surface union and free to flex inwardly, said span having an arched outer surface with a central tread section substantially narrower than the spacing between the walls and yielding under inward thrust through the major portion of its radial cushion movement through shear distortion of the material relatively to the side walls.

4. A cushioned tire comprising rigid side walls and a span of resilient material such as rubber spanning the space between the walls and secured to the side walls by a surface union and extending radially outwardly from the side walls, said span having an arched outer surface with a central tread section substantially narrower than the spacing between the walls and the span being free to flex inwardly and deformable in shear throughout its radial thickness, the inner portions being at least as soft as the tread portion of the tire.

5. A cushioned tire comprising rigid side walls having radial faces, a span of resilient material such as rubber secured to the side walls and free to flex inwardly through shear of the rubber relatively to the side walls, in combination with a wheel rim having axially faced edges, spacing rings between the side walls and the rim engaging the radial faces and the axial edges, and means exerting axial clamping pressure on the spacing rings to force them into engagement with the tire rim.

6. A cushioned tire comprising rigid side walls having radial faces, a span of resilient material such as rubber secured to the side walls and free to flex inwardly through shear of the rubber relatively to the side walls, in combination with a wheel rim having axially faced edges, spacing rings between the side walls and the rim engaging the radial faces and the axial edges, and means exerting axial clamping pressure on the spacing rings to force them into engagement with the tire rim, said rings exerting axial pressure initially compressing the tire axially.

7. A cushioned tire comprising an arched span of rubber free to flex inwardly in shear and having a thick tread section at the center substantially narrower than the width of the span and thin shear sections at each side of the tread section, rigid side walls bonded to the outer ends of the shear sections, and a stop spaced from the under side of the span engaging the under side of the tread section upon deflection of the shear sections inward between the side walls.

8. A cushioned tire comprising an arched span of rubber free to flex inwardly in shear and having sides converging toward a tread section substantially narrower than the width of the span, spaced substantially rigid side walls bonded to the outer ends of the span whereby load is transferred to the side walls from the tread section through shear of the converging sides, the outer contour of the span at the sides of the tread section being shaped to progressively engage the road under increasing deflection to decrease the effective length of the shear section and stiffen the tire.

9. An annular cushioned tire of resilient material such as rubber of channel form having narrow tread portions on its periphery and spans free to flex inwardly in shear and extending from the tread portions to attaching means at the sides, the spans yielding under and sustaining a major portion of the vertical load in shear, the spans being directed laterally from the tread in substantially direct continuation of the tread surface at an angle such that side loads are sustained principally in direct stress.

HUGH C. LORD.

REFERENCES CITED

The following references are of record in the file of this patent:

UNITED STATES PATENTS

| Number | Name | Date |
|---|---|---|
| 479,201 | Bolte | July 19, 1892 |
| 576,352 | DeSparre | Feb. 2, 1897 |
| 1,052,801 | Davidson | Feb. 11, 1913 |
| 1,395,770 | Rector | Nov. 1, 1921 |
| 1,788,862 | Darrow | Jan. 13, 1931 |
| 2,393,161 | Haushalter | Jan. 15, 1946 |

FOREIGN PATENTS

| Number | Country | Date |
|---|---|---|
| 17,715 | Great Britain | 1911 |
| 242,539 | Great Britain | 1925 |
| 337,955 | France | 1904 |